United States Patent [19]

Shishido et al.

[11] Patent Number: 4,711,999
[45] Date of Patent: Dec. 8, 1987

[54] APPARATUS FOR PHOTOMETRICALLY DETECTING AN OPTICALLY FOCUSED CONDITION OF AN OPTICAL SYSTEM

[75] Inventors: Yoshio Shishido, Fuchinobe Sagamihara; Susumu Takahashi, Hachioji; Kazumasa Matsuo, Tama; Atsushi Miyazaki, Hachioji; Shinichi Nishigaki, Hachioji; Shinichi Kato, Hachioji; Takeaki Nakamura, Hino; Akibumi Ishikawa, Hachioji, all of Japan

[73] Assignee: Olympus Optical Co., Ltd., Tokyo, Japan

[21] Appl. No.: 5,282

[22] Filed: Jan. 14, 1987

Related U.S. Application Data

[63] Continuation of Ser. No. 500,964, Jun. 3, 1983, abandoned.

[30] Foreign Application Priority Data

Jun. 5, 1982 [JP] Japan .................................. 57-96534
Jun. 5, 1982 [JP] Japan .................................. 57-96535

[51] Int. Cl.$^4$ ................................................. G01J 1/20
[52] U.S. Cl. ........................................ 250/204; 128/6; 250/201; 354/403
[58] Field of Search ................... 250/201, 204, 237 R; 128/6-9, 395-398; 350/96.26; 354/403, 404; 604/20-21

[56] References Cited

U.S. PATENT DOCUMENTS

| 3,327,712 | 6/1967 | Kaufman et al. | 350/96.26 X |
| 3,969,575 | 7/1976 | Gerritsen et al. | 250/201 AF X |
| 4,153,333 | 5/1979 | Harada et al. | 350/96.26 X |
| 4,153,834 | 5/1979 | Hayamizu | 250/201 AF |
| 4,340,811 | 7/1982 | Yamashita et al. | 250/201 AF |
| 4,521,680 | 6/1985 | Ando | 250/201 |
| 4,538,062 | 8/1985 | Shishido | 250/201 AF |
| 4,556,787 | 12/1985 | Shishido et al. | 250/201 AF |

FOREIGN PATENT DOCUMENTS

| 2655227 | 6/1977 | Fed. Rep. of Germany ... 350/96.26 |
| 49-19810 | 5/1974 | Japan . |
| 56-125713 | 10/1981 | Japan . |
| 56-128923 | 10/1981 | Japan . |

Primary Examiner—Edward P. Westin
Attorney, Agent, or Firm—Armstrong, Nikaido, Marmelstein & Kubovcik

[57] ABSTRACT

An apparatus for detecting a focused condition of an optical system, in which a light-receiving means arranged at a fixed position corresponding to a focus position photometrically detects a focused condition. A light beam having a definite shape is projected onto an object to be imaged by a light projection means. The reflected light beam is conducted along an optical axis of the optical system, deflected, and detected by the light receiving means for determining whether a focused condition exists. Several embodiments are disclosed for projecting a light spot of high contrast of the object and for detecting a focused condition on the basis of the intensity distribution of light received by the light-receiving means. The apparatus may be applied to an endoscope and other optical systems.

6 Claims, 39 Drawing Figures

FIG.10
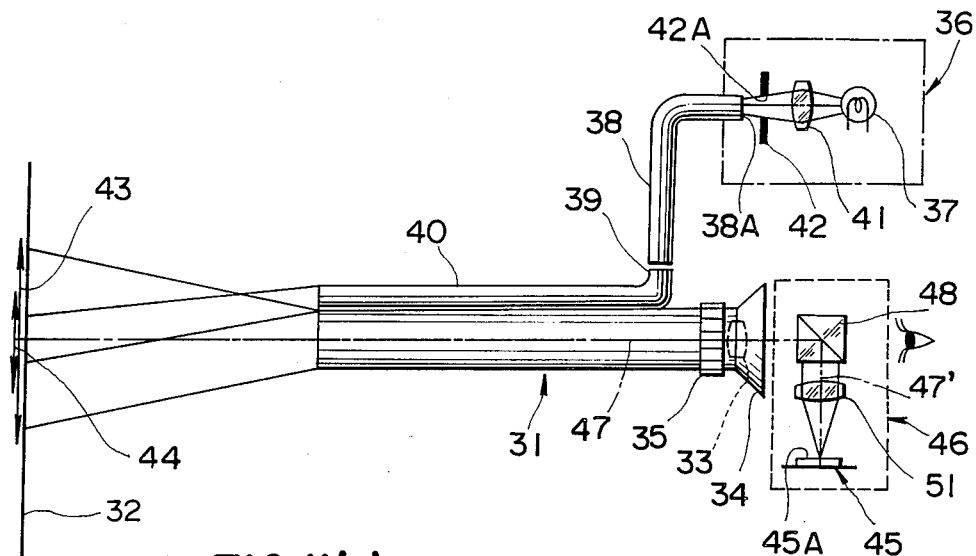
FIG.11(a)
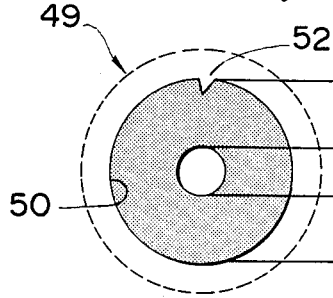
FIG.11(b)
FIG.12
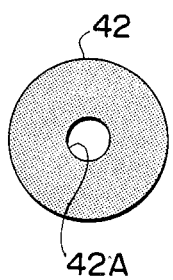
FIG.13(a)
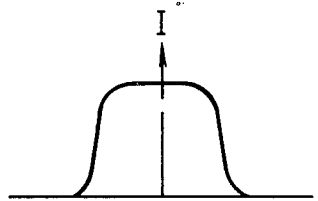
FIG.13(b)
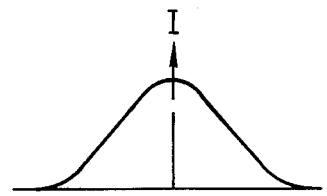

APPARATUS FOR PHOTOMETRICALLY DETECTING AN OPTICALLY FOCUSED CONDITION OF AN OPTICAL SYSTEM

This application is a continuation of application Ser. No. 500,964 filed June 3, 1983, now abandoned.

BACKGROUND OF THE INVENTION

The present invention relates to an apparatus for detection of a focused condition by projecting a definitely-shaped light beam to the object and examining photometrically the light beam reflected from the object with light-receiving means arranged at a position corresponding to a definite focusing position, thereby examining whether or not the focusing optical system is in a focused condition. Generally, in the viewing optical apparatus or optical camera such as endoscopes, photographic cameras and TV cameras etc., there are widely employed means for detection of a focused condition for examining whether or not such a condition is obtained so that the image produced by the optical system for photographing or focusing for the optical distance from the object may be clearly focused whereby the object may be clearly photographed or observed. Occasionally there may be additionally arranged a means which can displace said photographic optical system automatically to the position of a focused condition.

In the case of the object itself being dark or a sufficient photographic optical system being employed, the conventional apparatus for detection of a focused condition provide a generally smaller power output by their light-receiving element to make the focus-detection substantially impossible.

An irradiation means for directing the definite shaped light beam toward the object is described in Japanese Patent Publication No. 19,810/74. The Patent employs an optical system independent from the photographic lens system as an irradiation means. The optical system is not applicable to an endoscope, etc. that must photograph through a single light path.

In the means for employing a split prism as described in Japanese Patent Application Disclosure No. 128,923/81, when the detection apparatus is demanded to have an accuracy higher than a certain accuracy level, plural light-receiving elements are required. Accordingly the support system, for examining whether or not proper focusing is obtained by comparison with output signals, is rather complicated and particularly in limited production of smaller quantities such means may be high in cost.

Furthermore, Japanese Patent Application Disclosure No. 125,713/81, discloses apparatus for detection of a focused condition capable of determining whether an optical system is well-focused or not, even in the case of the object being faintly illuminated and the photographic optical system being dark wherein a flickering light is projected from its source to the object and the power-output signal of an extinguished section is subtracted from the power-output signal of a lighted section to alleviate the influence of outside light other than said light source. However, in addition to the definite focused surface of the film etc., two locations are arranged on both sides of said focused surface. The light projected to the object by the projection means is conducted to one of said locations. In this conventional example, relatively large surfaces are necessary for the lighting means and the light-receiving means and the structures of the optical system and the circuit system for detecting the focused condition are complicated, so that the detection apparatus is expensive.

On the other hand, when a conventional apparatus for detection of a focused condition is employed with an endoscope to detect the focusing condition, the light reflected from the object, such as organs inside the cavity of a living body, has lower contrast and also the viewing optical system of the endoscope has a faintly lighted sight. Also, it is often necessary to photograph from a short distance and so the focus depth becomes so small that both the apparatus for detection of a focused condition using the contrast method and the apparatus for setting the focused condition for automatically establishing a focused condition with such apparatus for detection of a focused condition are poor in reliability.

Accordingly, there is a requirement for a reliable and capable apparatus for detecting a focused condition which is effective even with an object of optically lower contrast such as living organs in a body cavity.

BRIEF SUMMARY OF THE INVENTION

An object of the present invention is to provide an apparatus for detecting a focused condition which is capable of detecting the focused condition with high accuracy.

Another object of the invention is to provide an apparatus for detecting a focused condition which can realize a simple effective structure at lower cost.

A further object of the invention is to provide an apparatus for detecting a focused condition which is widely applicable to optical equipment for industrial use.

Further objects, characteristics and advantages of the invention will be appreciated from the following explanation.

BRIEF EXPLANATION OF THE DRAWINGS

FIGS. 1–4 relate to an Example of the invention wherein

FIG. 1 is an explanatory view of the optical system of the Example applied to a scope;

FIG. 2 is a front view showing the shape of an iris;

FIG. 3 is an explanatory view showing, in enlargement, the light projection section;

FIGS. 5a and 5b show the lens of Example 2 of the invention, in which FIG. 5a shows a lateral cross section and FIG. 5b shows a front view of the lens, FIGS. 6a and 6b shows the lens of Example 3 of the invention, in which the FIG. 6a shows a lateral cross section and FIG. 6b shows a front view of the lens, FIGS. 7a and 7b show the lens of Example 4 of the invention, in which FIG. 7a is a perspective view of the lens and FIG. 7b is a lateral cross section of the lens, FIG. 8 is a front view showing the shape of the iris in Example 5, of the invention, FIG. 9 is an explanatory view showing the light receiving means in Example 6 of the invention, FIGS. 10–13 relate to Example 7 of the invention, wherein FIG. 10 is an explanatory view for Example 7 of the invention, FIG. 11a is an explanatory view showing the visual field image and FIG. 11b is a distribution diagram showing the intensity distribution in FIG. 11a, FIG. 12 is a front view showing the shape of the iris, FIG. 13a is a distribution diagram showing the intensity distribution in the focused condition, FIG. 13b is a distribution diagram showing the intensity distribution in the unfocused condition, FIGS. 14 and 15 relate to Example 8 of the invention, in which FIG. 14 is a front view showing the shape of the iris and FIG. 15 is an explanatory view showing the visual field image, FIGS. 16a, 16b and 17 relate to Example 9 of the invention, of which FIG. 16a is an explanatory view showing the visual field image, FIG. 16b is a distribution diagram showing the distribution of intensity in FIG. 16a, and FIG. 17 is a front view showing the shape of the iris, FIGS. 18a, 18b and 19 relate to Example 10 of the invention, of which FIGS. 20-23 show the means for collecting illumination and projecting it to the object, of which FIG. 20 is an explanatory view showing a first means, FIG. 21 is an explanatory view showing a second means, FIG. 22 is an explanatory view showing a third means and FIGS. 23 is an explanatory view showing a fourth means, FIGS. 24-26 relate to the application of the means for collection and projection of the light to an actual endoscope of the hard type, of which

DETAILED DESCRIPTION OF THE INVENTION

Figure 1:
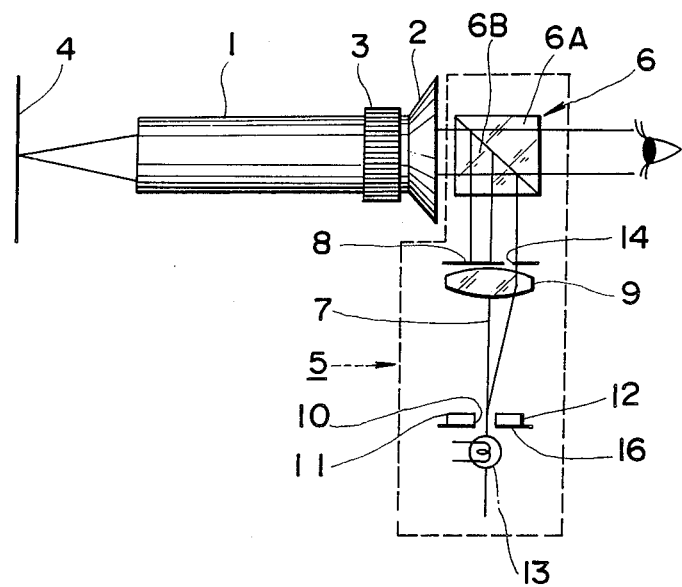

As shown in FIG. 1, a focus ring 3 formed on the periphery of an eye piece section 2 is rotated about the scope 1 so that the focusing optical system in the scope 1 is changed to control the focus position of the object 4 in front of the scope 1.

The apparatus 5 for detection of a focused condition in Example 1 of the present invention is mounted to the rear end of eye piece section 2 of scope 1.

A beam splitter, obtained by jointing two rectangular prisms 6A, 6B (or employing a half-mirror), is arranged to the rear of eye piece section 2 in detection apparatus 5, so that the viewer can inspect a partial light quantity through said beam splitter 6. To the rear along optical axis 7 after reflection of the optical axis 7 in the perpendicular direction, there are arranged an iris 8, a lens 9 for light-projection and for detection of a focused condition located near to the iris 8, receiving elements 11, 12 and a gap 10 between them, and a projection light source 13 located immediately after said gap 10.

Figure 2:
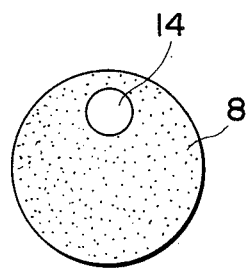
Figure 3:
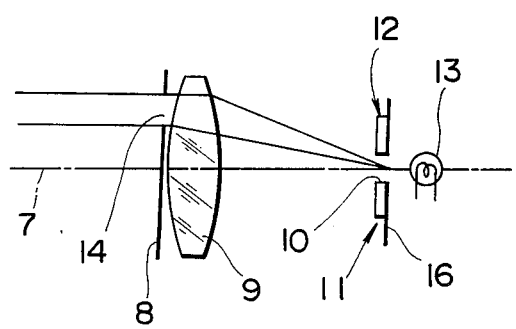

As shown in FIGS. 2 and 3, said iris 8 is separated from the optical axis 7, and the iris hole of said iris disc constitutes an opening 14 of the pinhole type to let the light beam pass through it at a position near to the periphery of lens 9.

On the other hand, as shown in FIG. 3 the photoelectric surfaces of the light-receiving elements are capable of letting photo-electric current flow corresponding to the light quantity received by the surfaces of both the light receiving elements 11, 12, so that the lengths of both light paths from the object 4 to the left and right photo-electric surfaces respectively may be made equal.

The back sides of these photo-electric surfaces are jointed to photo-screen plates 16 which have openings of the pin hole type positioned on the optical axis 7 and which interrupt the light.

Both of said light receiving elements 11, 12 are arranged in such an optical relation that the optical image of the object 4 to be inspected by the viewer may be clearly focused at the gap 10 by the reflection from the beam splitter 7 when the image appears at a focal position. In this case, the optical image may be arranged on the optical path lengths in conjugated relation, or further, the thus-obtained image may be refocused by another lens forwardly thereof.

Figure 4A:
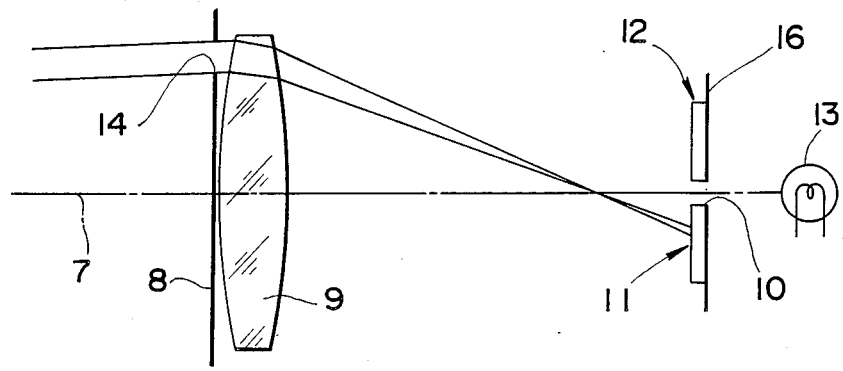
FIGS. 4a, 4b and 4c are explanatory views showing the principle for detecting whether it is in a focused condition.

The performance of Example 1 having such a constitution will be explained with reference to FIG. 4 as follows:

Provided that the focusing optical system of scope 1 has a focusing position (i.e., focal length) shorter than the position of (i.e., the distance to) object 4 (Hereafter referred to as "shorter focusing"), the light beam is transmitted from opening 14 to the object 4 substantially as a spot and, after being reflected from the object 4, is passed through said opening 14 to determine the light intensity photo-metrically. In this case, as shown in FIG. 4a said light beam having been focused on the optical axis 7 in front of said light receiving elements 11, 12 is then spread and separated from the optical axis 7 and is received by the photo-electric surface of light receiving element 11 arranged opposite to said opening 14 relative to the optical axis 7 so as to transmit a detection signal such as a photoelectric current, etc. according to the light quantity received. On the other hand, it is not received by the photo-electric surface of light receiving element 12 arranged on the side of opening 14 relative to the optical axis 7. Therefore by comparing the output levels of both light receiving elements 11, 12, it is determined that the shorter focusing condition has been detected.

Figure 4B:
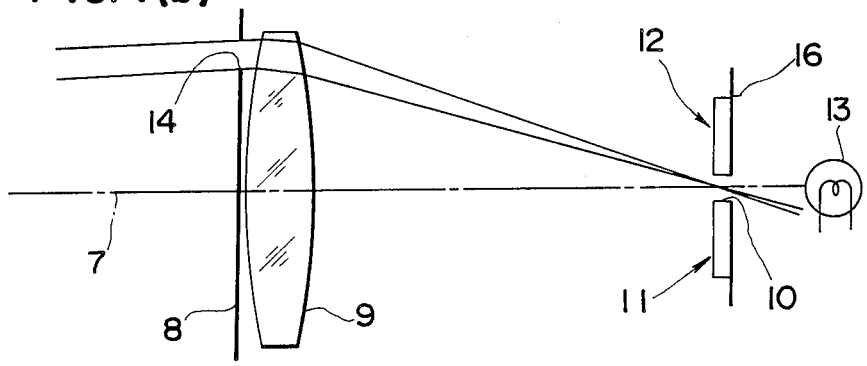

On the other hand, when the focusing optical system in scope 1 is adjusted to form a sharp image at the focus (focal point) of object 4, the light beam having passed through opening 14, projected collectively on the object 4, reflected from object 4 and again passed through opening 14 is collected between said light receiving elements 11, 12 as shown in FIG. 4b. Therefore the light beam does not reach the photo-electric surfaces of both light receiving elements 11, 12 so that the detection signals become substantially zero.

Figure 4C:
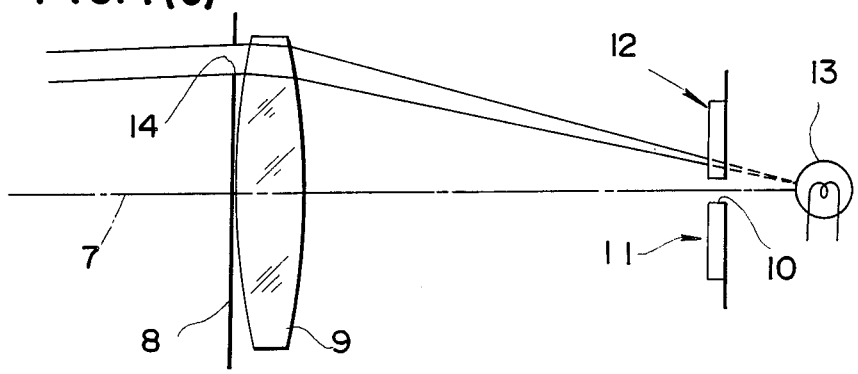

When the focusing optical system in scope 13 is adjusted to form the image at a position further than at the position of (i.e., distance of) object 4 (hereinafter referred to as "rear focusing"), the light beam having passed through opening 14 is projected collectively on the object 4, reflected from object 4 and again passed through opening 14, and is collected behind both light receiving elements 11, 12. In this case, as shown in FIG. 4c, as the light beam reaches the photo-electric surface of light receiving element 12 arranged on the side of opening 14 relative to the optical axis 7, a detection signal, corresponding to the received light beam quantity, is transmitted. Then the other light receiving element 11 does not receive the light beam, and the signal output thereof becomes substantially zero.

In this manner, the focus position, where the light beam reflected from the object 4 passes again through the focusing optical system with lens 9 and is collected, is displaced at least perpendicularly to the direction of optical axis 7 according to the distance of the object 4. A light receiving means is arranged along said direction. Thus, a determination can be made whether the apparatus is in a well-focused condition, shorter focused condition or rear focused condition depending upon the output levels of the detection signals of both light receiving elements 11, 12. Also the apparatus can be set for detection of a focused condition rapidly by rotating the focus ring 3 clockwise or counter-clock-wise according to the required displaced condition for focusing.

The above-mentioned light source 13 may be either a conventional lamp or an infrared lamp. Also, if light receiving elements 11, 12 are sensitive to light beams of particular wave lengths, the signal-to-noise ratio (S/N ratio) may be enhanced to heighten the detectibility of a focused condition. Also, a simple method of enhancing the S/N ratio is to flicker the light source 13 and alternately amplifying the output power of light receiving elements 11, 12.

In Example 1, though a lens 9 of the disc type with an iris opening 14 of the pin-hole type was employed, based on the above principle only the part adjacent to said opening is required to have a lens because only the lens section near to opening 14 can be employed for focus detection. Accordingly, as shown in FIGS. 5a and 5b, the lens 22 of Example 2 having square (or pinhole-like) iris openings 21 may be employed.

Figures 5A, 5B, 6A, 6B:
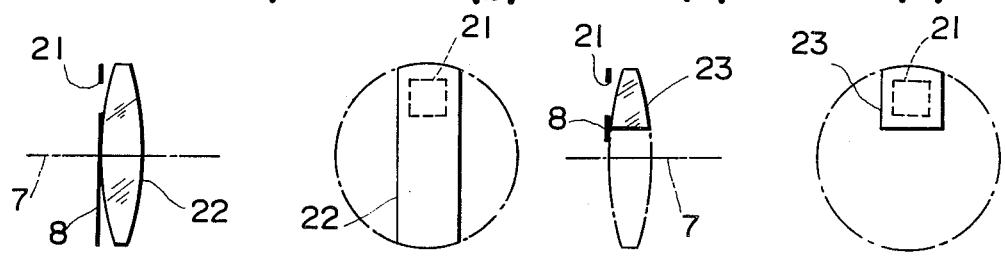

As shown in FIGS. 6a and 6b, the lens 23 of Example 3 can be either shaped with the lens on the optical axis 7 and the opening section 21 notched as shown in FIGS. 5a and 5b, or shaped as a cylindrical lens 24 in Example 4 as shown in FIG. 7.

Figures 7A, 7B, 8:
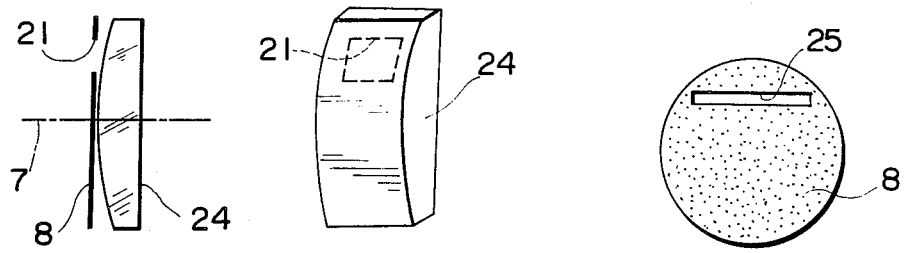

In the case of arranging two light receiving elements 11, 12 slightly separated, said opening 21 may be formed as a transversely extended opening 25 in Example 7 as shown in FIG. 8.

The iris 8 may be arranged to the rear of lenses 9, 22, 23 or 24, and also the iris 8 may be incorporated with lens 9 or, in other words, one surface of lenses 9, 22, 23 or 24 may be coated with a light screen. Furthermore, the light beam may be controlled by an electric field passing through a liquid crystal plate functioning as an opening or light screen film. Also the opening 14, 21 or 25 may be closed by a transparent member such as a glass plate etc. to form a transparent section for transmission of the light beam.

Figure 9:
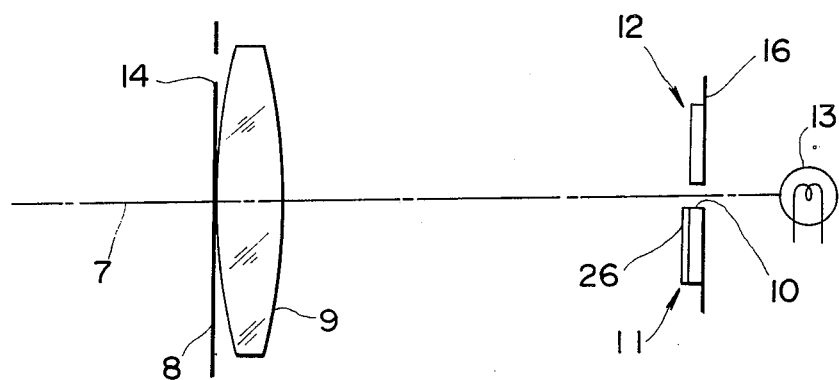

In another way, the light receiving elements 11, 12 may be arranged stepwise (i.e., in staggered fashion), and the light path length for light receiving element 12 on the side of the opening section (14 or 21 etc) relative to optical axis 7 may be arranged to be slightly shorter than that of the other light receiving element 11. Also in place of such a stepwise arrangement, the light receiving elements may be arranged along an inclined surface, or a transparent member 26 can be butted adhesively or separately on the front surface of light receiving element 11 to differentiate the light path lengths according to Example 6 as shown in FIG. 9. In such a manner, the light quantity to be received under a differentiation conditions is often increased (on the contrary, some of the light at light receiving element 12 having a longer light path is occasionally detectable whether or not it is in a well-focused condition, which case is within the scope of the present invention).

In the above case, though two light receiving elements 11, 12 are employed, at least three light receiving elements may be employed to detect which light beams at such light receiving elements are larger and how they are deflected with respect to the optical axis.

Furthermore the present invention is obviously applicable to an optical apparatus for clearly focusing an optical image not only in a scope but also on such a focusing surface as film, wherein said apparatus may be built in or mounted removably.

As mentioned above the apparatus of the present invention is composed of a means for projecting the focused condition-detecting light beam as a light spot onto the side of an object through a lens formed with a transparent part positioned separately from the optical axis thereof, whereby light passed through the transparent part is measured photometrically by plural light receiving means arranged on both sides of the optical axis in a direction perpendicular to the optical axis to obtain highly accurate detection of a focused condition by a simple construction. Also a lower cost is realized.

The endoscope applied with Example 7 of the present invention is composed as follows as shown in FIG. 10:

An object 32 arranged ahead of endoscope 31 is focused by the objective optical system arranged on the front side of the insertion section of the endoscope 31, so as to permit inspection from behind the eye piece section 34, containing the eye piece optical system 33, through the image-transmitting means. Furthermore a focus ring 35 for controlling the visuality to change the focusing position by displacing the eye piece optical system is mounted on the periphery of eye piece 34.

Said endoscope 31 has extending therethrough light beam-guide fibers 40 (which are mounted on the peripheral side thereof in the Example presented in the drawing) supplied to a mouth piece section 39 for guiding a light beam from a light-guide cable from the light source or lamp 37, whereby the object 32 is illuminated from the end surface of the front end of said light beam-guide 40.

Both a condenser lens 41 and iris 42 composing the essential part of Example 7 are arranged between the light source apparatus 36 and the introducing end surface 38A of light beam-guide cable 38 mounted to said light source apparatus 36, whereby the illumination of light source 37 is collected by the condenser lens 41 and also said end surface 38A is lighted with illumination of great intensity through the opening 42A formed in the center of iris 42 as shown in FIG. 12 so that illumination having great contrast within only a small area, for example, a range 44 smaller than the usual visual field 43, as shown in FIG. 10, may be projected on the side of object 32 by means of light beam-guide cable 38 and light beam-guide 40.

On the other hand, a contrast detector 46 containing as light receiving means light sensor 45 arranged with plural photo-electric cells, etc. is mounted to said eye piece 34.

A beam splitter 48 prepared by joining two prisms, etc. (it may be a half-mirror) is arranged along the optical axis 47 behind eye piece 34 in said contrast detector 46. When one eye is placed behind the beam splitter 48, the image of the object becomes visible within a visual range 50 in the visual field mask 49 of FIG. 11a. These components are arranged successively along the optical axis 47' (shown extending downwards in the drawing) reflected by the beam splitter 48.

The light receiving surface 45a of said sensor 45 is located at a predetermined image position, or, for example, the position distanced for a focal point from the viewer and conjugated optically with the image position focused through the eye piece-optical system 33 (of course, this should not be limited to said image position).

In short, when the optical image of object 32 is obtained clearly at the focal position, it is focused clearly on the light receiving surface 45A of optical sensor 45 arranged on the optical axis 47' and branched reflectingly by the beam splitter 48 as shown in FIG. 11a. An index 52 of the wedge type is arranged along the inner periphery of visual field mask 49.

The performance of Example 7 as constructed above will be explained as follows:

The light beam from light source 37 in the light source apparatus 36 is collected by lens 41 and iris 42 which compose the essential part of Example 7 and is projected on the object 32 through light-guide cable 38 and light guide 40. As shown in FIG. 10, this projected light beam with a sharp contrast because it is collected within a narrow range 44.

Therefore, provided that the angular position of said focus ring 35 is suitable, so that the optical image of object 32 obtained by the eye piece optical system 33 may be under a well-focused condition for obtaining a clear image at the predetermined position, the viewer can see the image illuminated within said narrow range 44 as shown FIG. 11a, and as shown in FIG. 11a the optical image corresponding to said narrow range 44 can be thus so obtained clearly on the light receiving surface 45A of the optical sensor 45 arranged at the conjugated position for said image along the optical axis 47' branched by the beam splitter 48. In this case, in reference to FIG. 11b or FIG. 13a for the distribution of optical intensity I of the light beam received by each photo-electric element of the surface 45A, it is found that the image for the center of the illuminated part of the object has great light-intensity while the image for the periphery has extremely small intensity. Therefore when the output powers of the photo-electric elements located successively or adjacently perpendicularly to the optical axis 47' are compared with each other to detect whether or not their output difference is larger than a predetermined value, then it can be determined whether the focusing condition is good or not. In FIG. 13, the position of the light receiving surface 45A is given on the abscissa.

If the angular position of focus ring 35 is unsuitable and the focus condition after passing through the eye piece optical system is out of the well-focused condition (in short, a shorter focused condition or rear focus condition), the light beam is not clearly focused on the light receiving surface 45A of light sensor 45 so that a graph of the distribution of optical intensity I appears like a smooth mountain. Accordingly, in comparing the outputs of successive or adjacent photo-electric elements to each other, a level difference higher than a certain value is not found. Therefore some insufficient focus condition can be assumed.

According to Example 7, in order to detect whether or not the focused condition has been established, it is sufficient that the light beam is projected to the side of object 32 to form the optical image of which only a part is bright and that the output difference between the photo-electric elements successively or adjacently located perpendicularly to the optical axis 47' are compared with each other.

The following methods are applicable for detecting whether or not the well-focused condition has been attained: 1. comparing the output power of adjacent or contiguous photoelectric elements, 2. judging whether or not single or plural photo-electric elements to be arranged in the central and bright part of the projected image transmit an output power of more than a predetermined value, and 3. judging from the output power of photo-electric elements arranged on the peripheral part of the light sensor.

Figure 14:
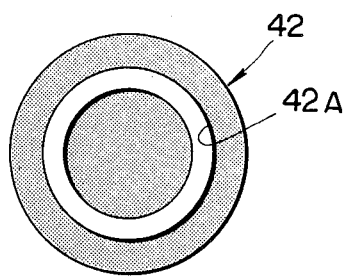
Figure 15:
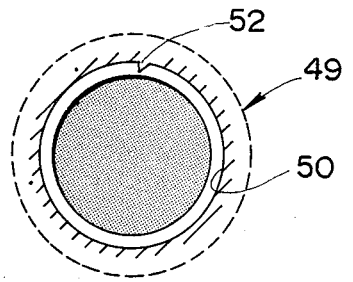

FIG. 14 shows the shape of the iris 24 in Example 8, wherein the outer periphery forms opening 42A for letting the light pass therethrough and which takes the place of the central part of Example 7. In this case, the visual field as observed behind the eye piece section 34 of FIG. 10 appears like FIG. 16.

Figures 16A, 16B:
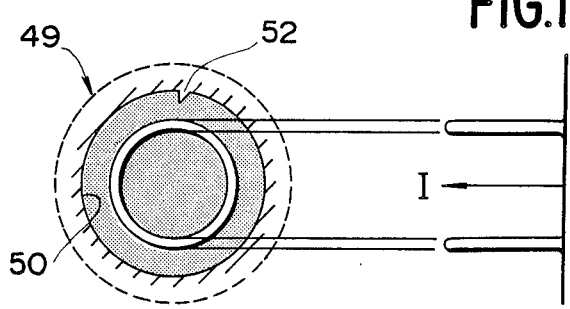

FIG. 16a presents the visual field image obtained in the focused condition of Example 9 of the present invention. In this Example 9, when the projected image having a high contrast is formed on the side of object 32 with an iris 42 having an annular opening section 42A of narrow breadth, the visual field image under a well-focused condition is shown in FIG. 16a. The annular part has a distribution having a high contrast due to the iris as shown in FIG. 16b and the other part has a distribution of small (or dark) contrast. In the case of insufficient focusing, the distribution has a smaller contrast. Therefore the optical sensor 45 permits detection of whether or not the image is well-focused as described in Example 7.

Figure 17:
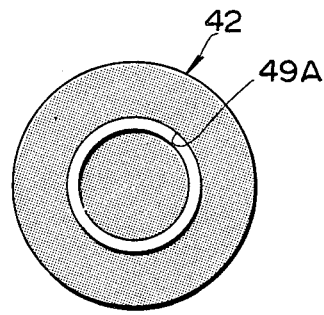
Figures 18A, 18B:
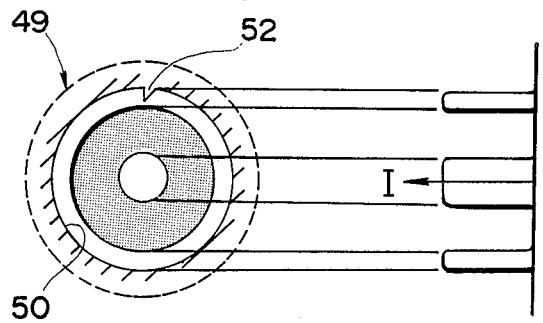
FIG. 18a is an explanatory view showing the visual field image.
FIG. 18b is a distribution diagram showing the intensity distribution in FIG. 18a and FIG. 19 in a front view showing the shape of the iris.

In FIG. 18a, there is shown a visual field image obtained under a focused condition of Example 10 which is prepared by projecting the light beam to the parts other than the annular part in addition to the annular part to form a projected image having a high contrast, contrary to the apparatus of FIGS. 16a and 17. In this case, the distribution of intensity I as focused on light receiving surface 45A of photo sensor 45 is shown in FIG. 18b, whereas an intensity distribution of smaller contrast is obtained under insufficient focused condition (not shown in the drawings).

Figure 19:
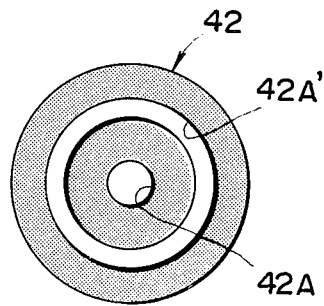

In this case, an iris 42 is formed both of an opening 42A of FIG. 19 and an annular opening 42A' concentric with and separated from said opening 42A.

Figure 20:
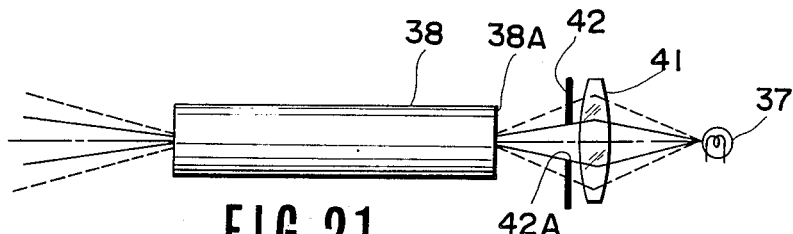
Figure 21:
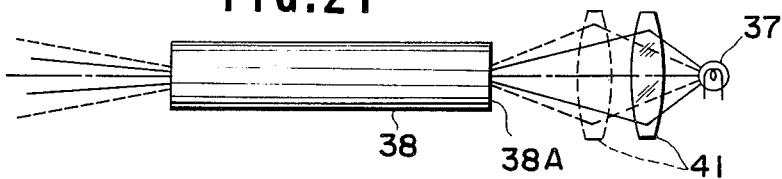

FIGS. 20 and 21 show a first and a second means forming a projected high-contrasted image like a spot. In FIG. 20, a spot-like high-contrasted image is formed by displacing the iris 42 or displacing the opening section 42A to reduce the projection angle onto the end surface 38A of light cable 38 to prevent the diffusion of the light beam. In FIG. 21, a similar effect is obtained by adjustingly displacing the lens 41.

Figure 22:
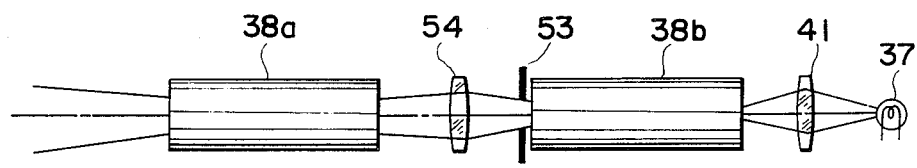

According to a third means of FIGS. 22, the light-guide cable 38 connected to the light-guide mouth piece 39 of the endoscope is divided into plural light-guide cables 38a, 38b (bisected in the drawings), an iris 53 and lens 54 are arranged therebetween, and the diffusion angle is made smaller to obtain a spot-like projection, thereby forming a projected image having a high contrast.

Figure 23:
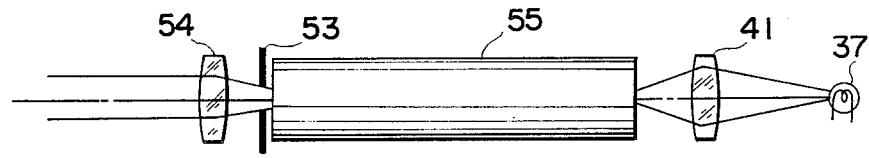

In FIG. 23 for a fourth means, an iris 53 and a lens 54 forwardly thereof are arranged at the front end of the illumination system 55 of an endoscope to obtain a parallel light beam, for example, to form a projection image having a high contrast on the side of object 32.

Figure 24:
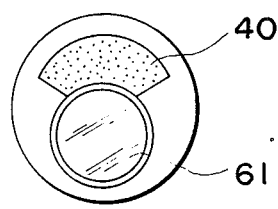
FIG. 24 is an explanatory view showing the optical system contained in the insertion section of the endoscope.
Figure 25:
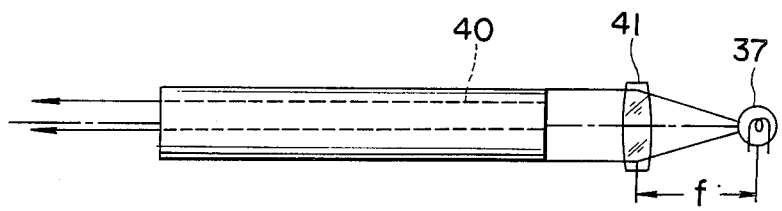
FIG. 25 is an explanatory view showing the arrangement of the means of collection and projection of the light so as to get parallel light in the optical system of FIG. 24.
Figure 26:
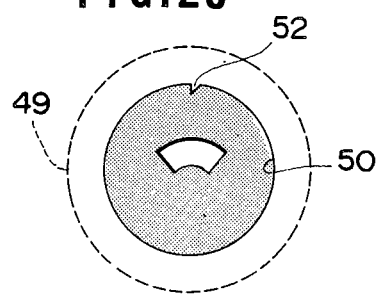
FIG. 26 is an explanatory view showing the visual field image of FIG. 25.
Figure 27:
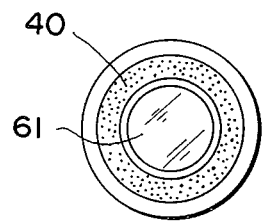
FIG. 27 is an explanatory view showing another optical system arranged in the insertion section of the hard endoscope.

The arrangement of light-guide 40 filled with fibers to form a sector in cross section as shown in FIG. 24 is combined with the formation of parallel light beam 37 at the focus position of condenser 41 as shown FIG. 25, whereby a projection image having a large contrast is formed out of the front end surface of light-guide 40 and a dark visual part is formed in other parts as shown in FIG. 26.

Figure 28:
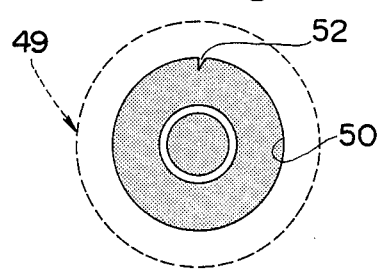
FIG. 28 is an explanatory view showing the visual field image in the case of employing the optical system as shown in FIG. 27.

Similarly in the case of the concentric center portion being the visual optical system 61 and the peripheral annular portion being the light-guide 40, the projection image obtained by collecting said parallel light beam 25 produces a visual field image as shown in FIG. 28.

Figure 29:
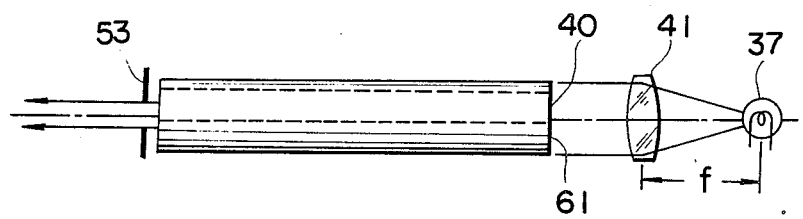
FIGS. 29 is an explanatory view showing the arrangement of the light projection means different from that of FIG. 25.

According to the arrangement of FIG. 29, an iris 53 is arranged at the front end surface of light guide 40 of FIG. 25 to project an illumination with a large contrast only with a narrow range.

As mentioned above, the projection image having a large contrast obtained by arranging the light receiving means positioned in optical conjugation with the predetermined focus surface and by projecting illumination through openings of various shapes onto a narrow area corresponding to a part of the visual field is detected by said light receiving means whether or not it is under a well-focused condition in employing the visual optical system of endoscope. However, the present invention is applicable also with another optical light source equipment or optical apparatus equipped with the means for projecting illumination on the side of object.

Also, in the above description, the illumination-transmitting means and the visual optical system or focusing optical system are independent systems from each other, though, for example, a beam, splitter or a halfmirror, etc. for projecting illumination through the visual optic system may be employed in place of light-guide mouth piece 39 connected to the light-guide cable 38 of FIG. 10.

Figure 30:
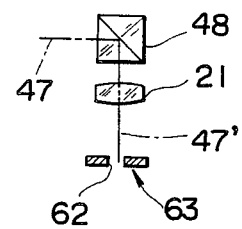
FIG. 30 is an explanatory view showing another light receiving means.

The apparatus of the present invention is designed to detect whether or not the output power of the photoelectric element arranged for the predetermined area of illumination exceeds a predetermined value or whether or not is has a level difference of more than a predetermined value by comparing the output levels of adajcent photo-electric elements. Also the apparatus of the invention may be designed, as shown in FIG. 30, to detect the focused condition according to whether the output power of the photo-electric element 63 becomes the minimum value of blank current level, etc. after receiving illumination with the photo-electric element 63 equipped with the pinhole-like opening 62 or nonphotosensory section 63 (it is also applicalbe to the optical system of FIG. 10).

As described above ever since the description of Example 7, the apparatus of the invention is designed to project illumination onto an area of a narrow range on the side of an object with great optical contrast thereby forming an image with great optical intensity distribution difference according to whether or not the image is under a focused condition, and easily detecting the focused condition by means of a light receiving element.

The disadvantages of the invention are that the apparatus can be simply constructed and has an excellent accuracy in detection of a focused condition.

Also in other Examples for embodiments appearing after Example 7, such variation as application of infrared light for detection of a focused condition, projection of a flickering light beam and elevation of S/N-ratio for detection of a focused condition are applicable.

It will be appreciated that different methods and embodiments for the present invention may be realized without deviating from the spirit and scope of the invention, and the present invention shall be limited only as claimed hereinafter.

What is claimed is:

1. An apparatus for photometrically detecting a focused condition of an image-forming optical system having a first optical axis, comprising:
    light projection means for projecting a definitely-shaped beam of light onto an object to be imaged;
    means for conducting light reflected from said object along said first optical axis of said image-forming optical system;
    beam-splitting means arranged along said first optical axis of said image-forming optical system for partially deflecting said light being reflected from said object along said first optical axis along a second ptical axis and for providing a first light path along said second optical axis;
    aperture means provided at a location eccentrically of said second optical axis for providing a second light path intersecting said first light path at a point along said second optical axis; and
    light-receiving means having first and second sides arranged along said second optical axis at a fixed location therealong corresponding to a focal position along said first optical axis of said image-forming optical system and including at least two photoelectric sensor means on said first side having respective photoelectric surfaces thereof arranged perpendicularly to said second optical axis and having a gap between said two photoelectric sensor means for projecting light from said light projecting means through said gap of said light-receiving means, said light projecting means being positioned on said second side of said light-receiving means,
    wherein a focused condition of said image-forming optical system may be detected photometrically by said light-receiving means in accordance with comparison of respective outputs of said at least two photoelectric sensor means.

2. An apparatus as set forth in claim 1, wherein said light projection means include a light source provided on said second optical axis on said second side of said light receiving means, and wherein light from said light source is passed through said aperture means before being projected onto said object to be imaged.

3. An apparatus as set forth in claim 1 wherein said aperture means comprises an iris having peripheral opening therethrough and a lens between said iris and said first side of said light-receiving means along said second optical axis, at least a peripheral portion of said lens being arranged in optical alignment with said opening.

4. An apparatus as set forth in claim 3 wherein said opening is a pinhole.

5. An apparatus as set forth in claim 3 wherein said opening is a slit.

6. An apparatus as set forth in claim 3 wherein said lens comprises a cylindrical lens portion.

* * * * *